United States Patent [19]

Hasegawa et al.

[11] Patent Number: 4,654,890

[45] Date of Patent: Mar. 31, 1987

[54] MULTIPLEX COMMUNICATION SYSTEM

[75] Inventors: Akira Hasegawa, Katsuta; Takanori Shibata, Hitachi; Fumio Hamano, Katsuta, all of Japan

[73] Assignee: Hitachi, Ltd., Tokyo, Japan

[21] Appl. No.: 772,615

[22] Filed: Sep. 4, 1985

[30] Foreign Application Priority Data

Sep. 5, 1984 [JP] Japan .................. 59-184495
Mar. 2, 1985 [JP] Japan .................. 60-40311

[51] Int. Cl.[4] .................. H04B 9/00; H04J 3/02
[52] U.S. Cl. .................. 455/607; 455/612; 370/85; 340/825.05
[58] Field of Search .................. 455/607, 612, 606, 610, 455/603; 370/85; 340/825.05, 48, 826.06; 307/10 R; 123/633; 364/431.03, 424

[56] References Cited

U.S. PATENT DOCUMENTS 4,184,056 1/1980 Basch et al. .................. 455/612
4,380,225 4/1983 Wesemeyer et al. .................. 123/633

FOREIGN PATENT DOCUMENTS 0047669 9/1980 European Pat. Off. .................. 455/611
0097734 6/1982 Japan .................. 455/612
0092948 6/1982 Japan .................. 455/606

OTHER PUBLICATIONS

Phillips et al.; *Electronic Engineering;* "Bus Systems in the Car;" vol. 55, No. 675; Mar. 1983; pp. 134-144; London.
Kingsbury; Mini-Micro Conference Record; "Silicon Solutions for Small Area Networks;" May 1984; pp. 1-6; paper 12; New York.

*Primary Examiner*—Robert L. Griffin
*Assistant Examiner*—Andrew J. Telesz, Jr.
*Attorney, Agent, or Firm*—Antonelli, Terry & Wands

[57] ABSTRACT

A multiplex communication system comprises a central control unit, a plurality of local control units, an optical loop transmission path interconnecting the central control unit and the plurality of local control units by optical fibers in a loop-like configuration to thereby cause data transmission to be effected among the control units through the optical fibers, and an electrical loop transmission path for interconnecting the central control unit and the plurality of local control units by electrical signal conductors in a loop-like configuration to thereby cause data transmission to be effected among the control units through the electrical signal conductors, wherein the central control unit selects at least one of the optical loop transmission path and the electrical loop transmission path to be connected to the signal transmitter means in dependence on predetermined conditions, so that data transmission is conducted between the central control unit and the local control units through the selected loop transmission path.

13 Claims, 16 Drawing Figures

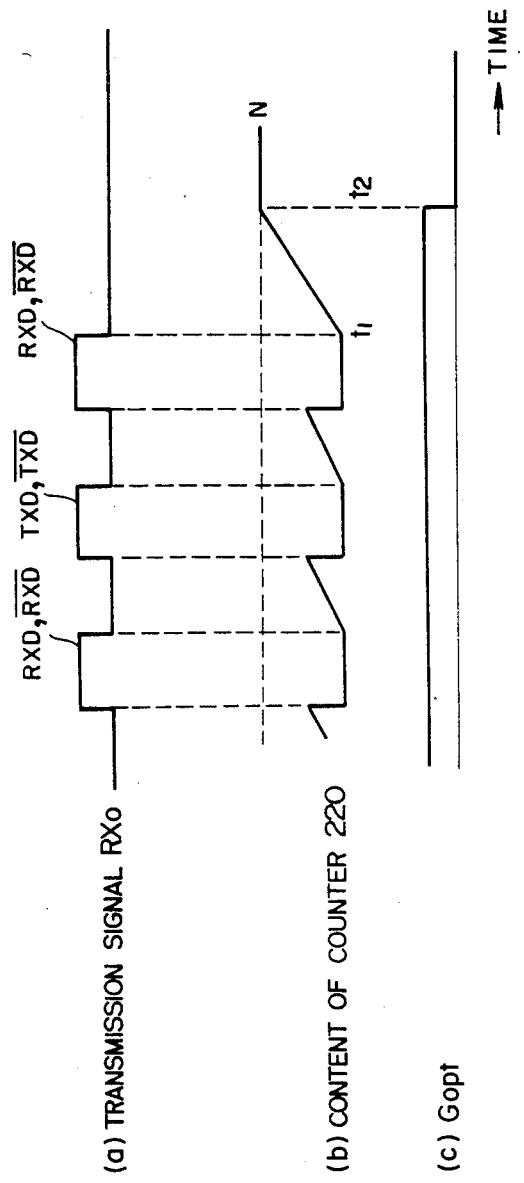

MULTIPLEX COMMUNICATION SYSTEM

BACKGROUND OF THE INVENTION

The present invention relates to a multiplex communication system based on a loop transmission and, more particularly, to a multiplex communication system which is suitable for realizing a concentrated or intensive wiring in a motor vehicle.

As an attempt to realize a concentrated or intensive wiring by multiplexing data transmission in a motor vehicle, there has been heretofore proposed a multiplex communication system in which optical fiber inherently less susceptible to noise is employed for constituting transmission line or path. As a typical one of such system, there may be mentioned a double-loop transmission or communication system implemented by using optical fiber.

The double-loop transmission system can certainly assure a high reliability of data transmission. However, since each of transmitter units requires four photoelectric converters, difficulty is encountered in miniaturization of the transmitter unit. Further, all the photoelectric converters belonging to either one or other of the double loop optical fiber transmission paths have to be operated simultaneously in the course of data transmission, involving thus a relatively large power consumption. As a consequence, when the double loop transmission system employed in a motor vehicle is continuously operated for a long time with the engine of the vehicle being stopped, there may arise such undesirable situation that an onboard battery is exhausted, giving rise to a problem.

An example of the double loop transmission system of this kind is disclosed, for example, in Japanese Patent Application Laid-Open No. 92948/1982.

SUMMARY OF THE INVENTION

It is an object of the present invention to provide a multiplex communication system which is immune to the disadvantages of the prior art system described above and which can be realized in the form of a double loop transmission system of a sufficiently miniaturized scale with significant reduction in power consumption without degrading the reliability of data transmission, and thus can be employed effectively in a motor vehicle requiring intensive wiring.

In view of the above and other objects which will be more apparent as desciption proceedes, it is proposed according to a general aspect of the invention that a loop transmission path realized by electrical conductors is additionally provided in combination with a loop transmission path realized by optical fibers to thereby constitute a double loop transmission system in which the two transmission paths are made use of, so to say, in a complementary manner.

By virtue of the complementary use of the two transmission paths, not only a high reliability of data transmission can be secured but also the miniaturization as well as low power consumption can be accomplished due to unnecessity of employing the photoelectric converters in the loop transmission path constituted by electric signal conductors.

BRIEF DESCRIPTION OF THE DRAWINGS

FIG. 11 is a timing chart for illustrating operation of the photoelectric converter.

DESCRIPTION OF THE PREFERRED EMBODIMENTS

Figure 1:
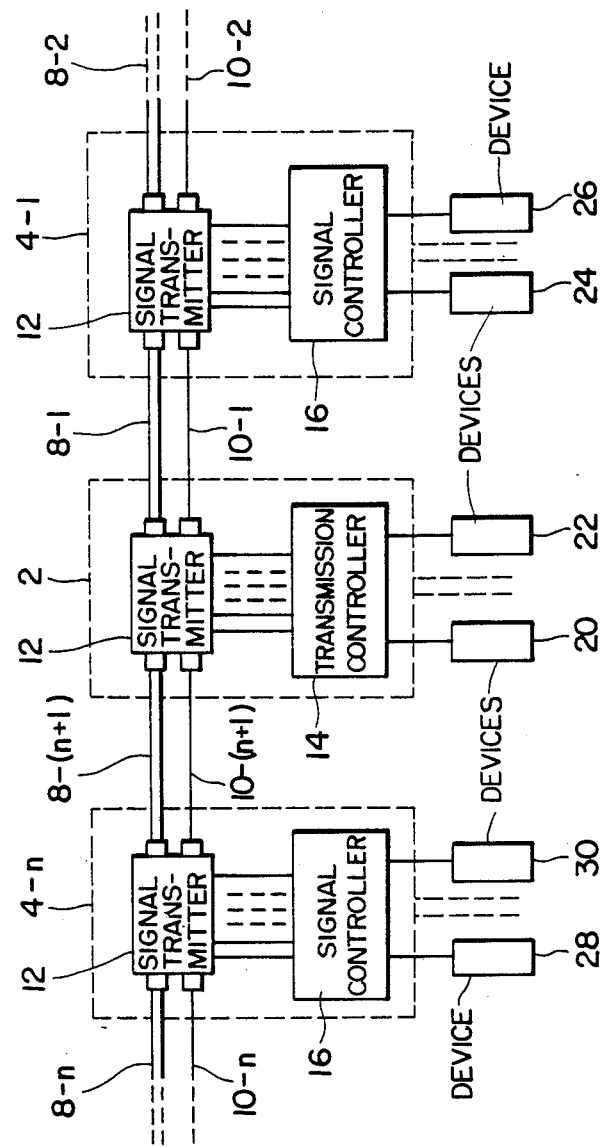
FIG. 1 is a block diagram showing a general arrangement of a multiplex communication system according to an exemplary embodiment of the present invention.

Now, the invention will be described in detail in conjunction with exemplary embodiments thereof by referring to the accompanying drawings, wherein like reference characters are used to denote like parts having same or equivalent functions, respectively, throughout the drawings.

FIG. 1 is a block diagram showing an exemplary embodiment of the invention applied to a multiplex communication system for a motor vehicle. Referring to FIG. 1, the illustrated multiplex communication system is composed of a central control unit 2 and a plurality of local control units 4-1, . . . , 4-n which are intercoupled by way of an optical signal loop transmission path composed of optical fibers 8-1, . . . , 8-(n+1) and an electrical signal loop transmission path composed of electrical signal conductors or lines 10-1, . . . , 10-(n+1) to thereby constitute a double or duplex loop communication system.

The central control unit 2 is equipped with a signal transmitter 12 and a transmission controller 14 to control data transmission to the plurality of the local control units 4-1 to 4-n. The central control unit 2 may further be so confugured as to control a variety of electric devices and/or instruments such as switches, meters, lamps, displays, sensors and others as indicated by reference numerals 20 and 22 which are disposed in the vicinity of the location where the central control unit is installed in the motor vehicle.

On the other hand, each of the plural local control units 4-1 to 4-n is equipped with a signal transmitter 12 and a signal controller 16 for controlling a variety of electrical devices and/or instruments such as those indicated by 24, 26, 28, 30 and mounted in the automobile near respective local control units.

Figure 2:
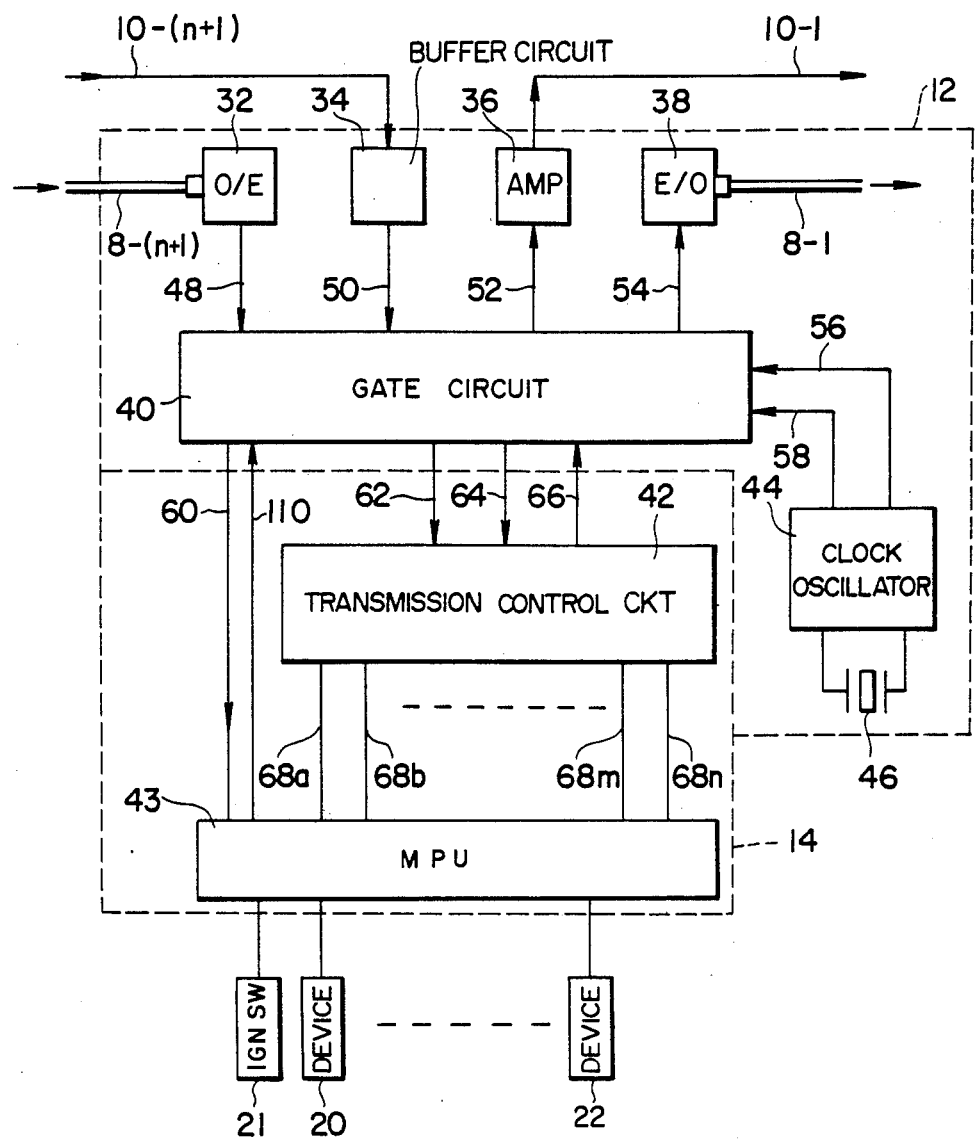
FIG. 2 is a block diagram showing a circuit arrangement of a central control unit employed in the system shown in FIG. 1.

FIG. 2 is a block diagram showing a circuit configuration of the central control unit.

In FIG. 2, a reference numeral 32 denotes an opto-electronic converter for converting an optical signal inputted thereto from the optical fiber 8-(n+1) located upstream of the central control unit, into an electric signal which is then applied to a gate circuit 40 by way of a signal line 48. A numeral 34 denotes a buffer circuit for receiving an electrical signal inputted thereto from the electric signal conductor 10-(n+1) located upstream of the central control unit to supply the electric signal to the gate circuit 40 by way of a signal line 50. A numeral 36 denotes an amplifier circuit for amplifying the electric signal supplied from the gate circuit 40, the output signal of the amplifier 36 being fed to the electric signal conductor 10-1 located downstream of the central control unit. A numeral 38 denotes an electrooptical converter for converting the electric signal supplied from the gate circuit 40 into an optical signal, which is then supplied to the optical fiber 8-1 located downstream of the central control unit.

Figure 3:
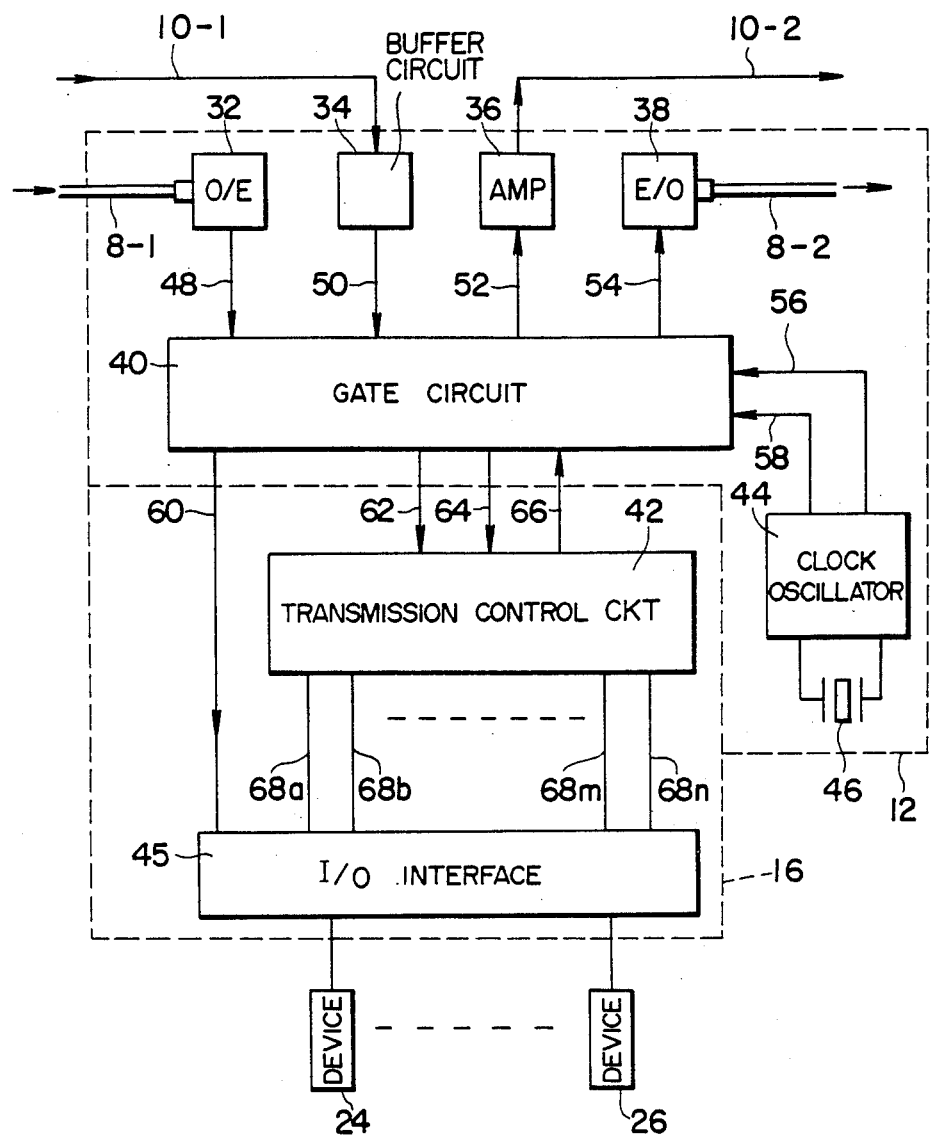
FIG. 3 shows in a block diagram a circuit configuration of a local control unit employed in the system shown in FIG. 1.

A numeral 42 denotes a transmission control circuit having a clock input terminal connected to a clock line 64, a serial signal input terminal connected to a signal line 62, and a serial signal output terminal connected to a line 66 serving as a send-out path. Further, the transmission control circuit 42 includes a microcomputer unit (MPU) 43 incorporating a microcomputer for controlling signal transfer between the local control units and the central control unit and lines 68a, . . . , 68n functioning as address lines, control input lines, and data input lines. The microcomputer unit or MPU 43 may be connected to the electric devices and/or instruments and an ignition switch 21. A reference numeral 44 denotes a clock generator having a vibrator element 46. On the basis of the oscillating frequency, two clock pulse signals having different frequencies are generated and inputted to the gate circuit 40 through lines 56 and 58. The gate circuit 40 is provided with the aforementioned various input and output terminals and serves to select one of the two types of clock pulse signals, one of the reception signal lines 48 and 50, and one of transmission signal lines 52 and 54. An exemplary embodiment of the gate circuit 40 is illustrated in FIG. 3, details of which will be described later on. The photoelectric converters 32 and 38, the buffer circuit 34, the amplifier circuit 36, the gate circuit 40, the clock oscillator 44 and the vibrator element 46 constitutes the signal transmitter 12, while the transmission control circuit 42 and the MPU 43 constitutes the transmission controller 14.

FIG. 3 shows in a block diagram a circuit configuration of the local control unit. In the figure, an exemplary configuration of the local control unit 4-1 is illustrated. It should however be understood that the other local control units 4-2, . . . , 4-n can be implemented in the same circuit configuration as the unit 4-1.

The local control unit 4-1 includes a signal transmitter 12 and a signal controller 16, wherein the signal transmitter 12 is of the same structure as that of the central control unit shown in FIG. 2. The signal controller 16 includes a transmission control circuit 42 and an input/output interface 45, wherein the transmission control circuit 42 is of the same structure as that of the central control unit shown in FIG. 2. Connected to the input/output interface 45 are the aforementioned electric devices and/or instruments 24, . . . , 26, whose output signals are supplied to the transmission control circuit 42 through lines 68a to 68n, while control signals are supplied to the electric device and/or instruments 24, . . . , 26 from the transmission control circuit 42 for the control of the former.

Figure 5:
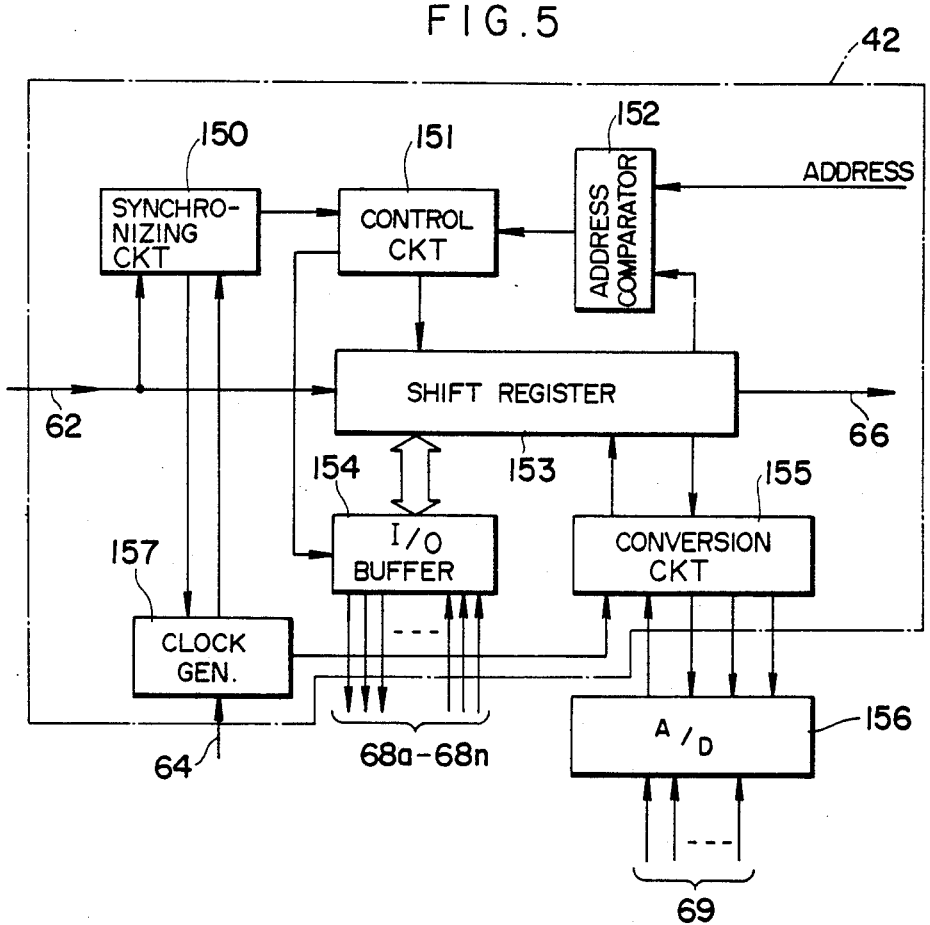
FIG. 5 is a block diagram showing an exemplary embodiment of a transmission control circuit employed in the system shown in FIG. 1.

The transmission control circuit 42 may be of the structure disclosed in U.S. patent application Ser. No. 619,998 filed June 12, 1984, by way of example. The structure is shown in FIG. 5.

Figure 4:
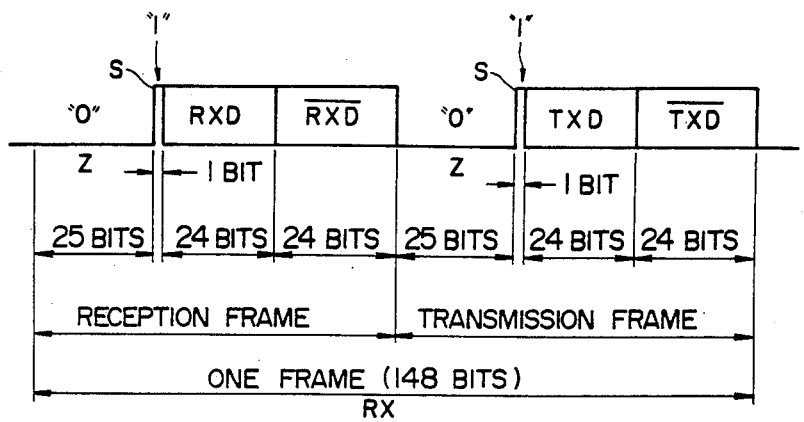
FIG. 4 is a view for illustrating a transmission signal frame structure utilized according to the invention.

In this circuit 42, there is employed a reception/transmission frame illustrated in FIG. 4 as the transmission signal frame for data transmission. The single frame may be constituted, for example, by 148 bits, wherein a half of these bits are allotted for reception with the remaining half being allocated for transmission.

The reception frame is a signal frame outputted from the central control unit as the transmission frame and composed of a zero-level segment Z including a series of 25 bits, a start-bit segment S including a single bit, a reception data field RXD including 24 bits, and an inverted data field $\overline{RXD}$ of 24 bits corresponding to the inversion of the reception data RXD.

The reception data field RXD contains control data for controlling the electric devices/instruments such as, for example, lamps, display and the like, and the transmission data TXD contains monitor data representing detected states of the electric devices/instruments such as, for example switches, sensors and others.

The transmission frame is likewise composed of a zero-level segment Z of 25 bits, a start bit segment of a single bit, transmission data TXD of 24 bits, and inverted data $\overline{TXD}$ resulting from inversion of the data TXD. Each of the reception data RXD and transmission data TXD contains address information, for example, of 4 bits.

It is to be noted that the zero-level segment Z should preferably includes a number of bits which is greater than the bit number of the reception or transmission data in order to allow the reception data and the transmission data to be discriminated from each other. In the case of the illustrated example, the zero-level segment Z contains 25 bits in contrast to the 24 bits constituting the reception data field and the transmission data field, respectively. The use of the inverted data $\overline{RXD}$ and $\overline{TXD}$ is for the purpose of checking errors possibly involved in the course of transmission.

Referring to FIG. 5, the transmission control circuit 42 is composed of a synchronizing circuit 150, a control circuit 151, an address comparison circuit 152, a shift register 153, an input/output (I/O) buffer 154, an analogue-to-digital (A/D) converter circuit 156, and a clock generator 157.

The transmission control circuit 42 is operated by the clock pulse supplied from the gate circuit 40 by way of the line 64, wherein signal transmission rate is set at one sixteenth of the frequency of this input clock signal. The signal transmission rate is 250 KHz for the clock pulse signal of the frequency of 4 MHz and about 15 KHz for a clock pulse signal of 250 KHz, by way of example. In this way, the clock generator 157 divides the frequency of the clock signal inputted through the line 64 by a divisor of 16.

Referring to FIG. 5, the signal of a single frame inputted through the line 62 (also illustrated in FIG. 3) is supplied to the synchronizing circuit 150. The latter is constantly in the state ready for receiving the signal of the frame structure illustrated in FIG. 4, and upon reception thereof, the synchronizing circuit 150 counts successively the bits of the zero-level segment of the reception frame in terms of time. When appearance of the start bit S of logic "1" is detected in succession to the 25 bits of the zero-level segment, the synchronizing circuit 150 supplies a control signal to the clock generator 157 to thereby cause the clock signal output from the clock generator 157 to be synchronized with the start bit S. In this way, the synchronizing circuit 150 allows the clock signal to be supplied to the control circuit 151 in synchronism with the start bits. The control circuit 151 in turn produces a control signal which is supplied to the shift register 153 to allow the data of the reception data field RXD to be serially loaded in the shift register 153. On the other hand, the address comparator circuit 152 is supplied with an address previously assigned to the transmission control circuit. In the address comparator 152, this address is compared with the address contained in the reception data RXD loaded in the shift register at predetermined bit positions of the shift register. Only when both addresses coincide with each other, the data placed in the shift register 153 is allowed to be transferred to the I/O buffer 154. More specifically, the control circuit 151 contains a counter whose content is incremented for producing sequential control signals to the shift register for causing data of the reception data field RXD to be transferred to the I/O buffer 154 in parallel. As a consequence the control data contained in the reception data field RXD are supplied to the associated electric devices/instruments from the I/O buffer 154 through the signal lines 68 for the control of operations as well as detection of the operating states of the electric devices/instruments. In the case of the central control unit, the control/monitor data contained in the reception data RXD supplied from the I/O buffer are fed to the respective electric devices/instrument by way of the MPU 43, while in the case of the local control unit the control/monitor data are fed to the associated electric devices/instruments through the input/output interface 45.

Subsequently, output data signals of the electric devices/instruments being monitored are supplied to the I/O buffer 154 through the lines 68. The shift register 153 fetches these data in parallel from the I/O buffer 154 for storing therein in the form of serial data. The data are read out serially from the shift register 153 to be transmitted as the transmission data TXD contained in the transmission frame. At this point, exchange of data corresponding to one cycle in the half duplex system has been completed.

In the A/D conversion circuit 155, analogue data produced by the devices such as sensors or the like (not shown) are supplied to the A/D converter 156 over the line 69 which digitizes selectively the input analogue data signal to supply the digital data to the shift register 153, whereby the digital data are send out from the shift register 153 as the transmission data TXD.

Figure 6:
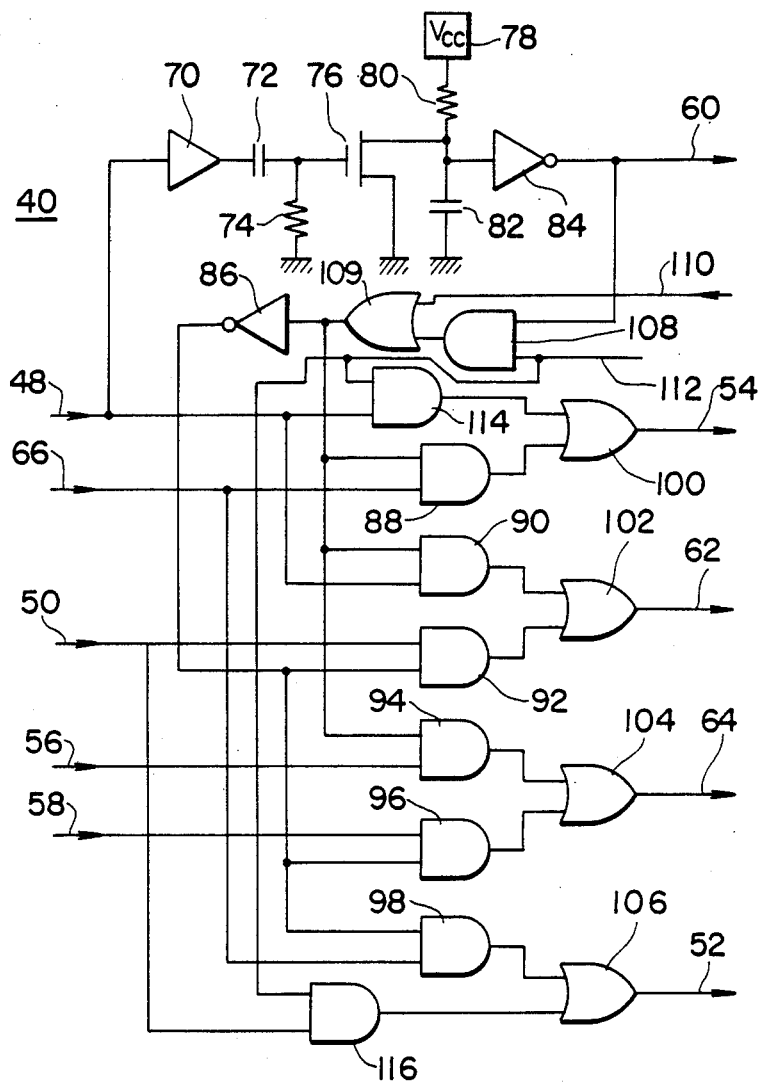
FIG. 6 is a diagram showing a circuit configuration of a gate circuit.

Next, description will be made of the gate circuit 40 by referring to FIG. 6 which shows an exemplary embodiment of the gate circuit 40. It is assumed that no failure or abnormality takes place in the optical system including the optical fibers 8-1, . . . , 8-(n+1) for data transmission, i.e. the optical system is in the normal state. In this state, the data transmission based on the signal frame shown in FIG. 4 is conducted periodically at a constant time interval through the optical fibers so that the signals shown in FIG. 4 are periodically fed to the line 48.

It will be seen that the line 48 is coupled through an AND gate 114 and an OR gate 100 to the output line 54 and also to an amplifier 70. As a result, the signal on this line 48 is first amplified by the amplifier 70 and is then applied to a gate electrode of an FET (field effect transistor) 76 through a differentiator circuit composed of a capacitor 72 and a resistor 74 to control an integrating circuit composed of a resistor 80 and a capacitor 82. More specifically, this integrating circuit has its capacitor 82 charged with a DC current at a predetermined time constant from a DC power supply source 78 through the resistor 80. However, when the FET 76 is turned on, the terminal voltage of the capacitor 82 is discharged through the FET to the zero level, and thereafter the capacitor 82 is again charged with DC current charging from the time point when the FET 76 is turned off. The FET 76 is made to turn on only upon application of the reception data RXD, $\overline{RXD}$, and the transmission data TXD, $\overline{TXD}$ illustrated in FIG. 4, by selecting appropriately the time constant of the differentiating circuit (72, 74).

Accordingly, when the time constant of the integrating circuit composed of the resistor 80 and the capacitor 82 is selected at a predetermined value, the terminal voltage of the capacitor 82 can be prevented from rising beyond the predetermined level, so long as the signal illustrated in FIG. 4 is being inputted at a predetermined frequency from the line 48, whereby the output 60 of an inverter 84 can be constantly held at the level "1".

The appearance of the signals on the line 48 at the predetermined frequency implies that the transmitting operation through the optical loop system employing the optical fibers is effected normally. More specifically, the optical loop system can be considered to be normal so long as the signal level on the line 60 transmitting the output signal of the inverter 84 is of logic "1". On the other hand, when the line 60 assumes the level "0", it is determined that the optical loop system is disturbed by the occurrence of abnormality (i.e. occurrence of failure). In this way, it is possible to monitor the optical loop system as to the occurrence of abnormality or failure by detecting discriminatively the signal level on the line 60.

An input line 112 and AND gates 108, 114 and 116 serve to change the function of the gate circuit 40 between when the use of the circuit 40 in the central control unit 2 and the use of the same in the local control units 4-1 to 4-n. More specifically, when the gate circuit 40 is used in the central control unit 2, the input line 112 is grounded so that it is held at the level "0". On the other hand, when the gate circuit 40 is to be used in the local control units 4-1 to 4-n, the input line 112 may be connected to a DC power supply source so as to be held at the level "1". An input 110 is used only when the gate circuit 40 is installed in the central control unit 2 and is held in the opened state when the same is installed in the local control units 4-1 to 4-n.

Next, the operations of this gate circuit will be described.

In the central control unit 2, the transmission control circuit 14 monitors the state of the optical loop system by checking the state of the line 60 of the gate circuit 40 of the signal transmitter 12. So long as no abnormality occurs in the optical loop system except for the initiation phase of operation of the system, the control for effecting the transmission through the optical is put into effect on principle. To this end, the signal level on the line 110 is first set at level "1", as the result of which only the AND gates 88, 90 and 94 are enabled. At that time, however, the central control unit has the signal on the input line 112 set at the level "0", as described above, so that the AND gates 108, 114 and 116 all remain in the disabled or closed state.

At that time therefore, the transmission signal on the line 66 is transferred through the AND gate 88 and the OR gate 100 onto the line 54 and is transmitted from the electrooptical converter 38 to the optical fiber section located downstream of the control unit under consideration. On the other hand, the received signal making appearance on the line 48 from the upstream optical fiber through the optoelectrical converter 32 is fed through the AND gate 90 and the OR gate 102 onto the line 62. In this manner, the data transmission is performed through the optical loop system constituted by the optical fibers.

Since the line 56 is coupled through the AND gate 94 and the OR gate 104 to the line 64 at that time, higher-rate clock (e.g., of 4 MHz) of the two kinds of clocks on the lines 56 and 58 is inputted to the clock input line 64 of the transmission control circuit 42 so that this circuit 42 is operated at the high transmission rate (e.g., at 250 KHz).

Further, since the AND gates 92 and 116 are in the closed or disabled state, the line 50 is connected neither to the line 62 nor to the line 52, while the line 66 is also decoupled from the line 52 because of the AND gate 98 being disabled.

Now, description will be directed to the operation of the gate circuit 40 installed in each of the local control units 4-1, ..., 4-n.

In each of the local control units 4-1, ..., 4-n, the signal level on the input line 112 is set at logic "1", resulting in that the AND gates 108, 114 and 116 are enabled.

As a consequence, when the data or signal transmission is conducted from the central control unit 2 through the medium of the optical loop system, as described above, the level on the line 60 is held at logic "1". Accordingly, the output level of the AND gate 108 assumes logic "1", whereby the AND gates 88, 90 and 94 are enabled to assume the state in which the line 48 is coupled to the line 62 whereas line 66 is coupled to the line 54 to allow the data transmission through the optical loop system.

At that time, the upstream line 48 and the downstream line 54 are also connected to each other through the AND gate 114 and the OR gate 100, whereby the signals transmitted from the central control unit 2 can be received substantially simultaneously by all the local control units 4-1 to 4-n, to assure the transmitting and receiving operations of the transmission control circuit 42 with a high reliability.

Further, it is evident that the operation can be performed with the same high clock rate as the case of the central control unit 2 because of the AND gate 94 being enabled.

Next, it is assumed that abnormality takes place in the digital transmission effected through the optical loop system for some reason such as the breakage of the optical fibers 8-1, ..., 8-(n+1).

In the assumed state, the signal on the line 48 disappears in the gate circuit 40 of the central control unit 2, resulting in that the signal level on the line 60 is changed over from the logic level "1" to "0" with a predetermined time delay.

Then, the transmission controller 14 of the central control unit 2 detects that the signal level on the line 60 is changed to the level "0", and correspondingly changes the level of the input line 110 from "1" to "0" to replace the transmission operation through the optical loop system with that through the electrical loop system employing the electric conductors. More specifically, when the input 110 assumes the level "0", the AND gates 92, 96 and 98 are enabled because of the output level of the inverter 86 being "1", to thereby allow the line 50 for transmitting the signal originating upstream of the control unit under consideration to be connected to the line 62 through the AND gate 92 and an OR gate 102, while the line 66 on which the transmission signal appears is coupled to the line 52 through the AND gate 98 and an OR gate 106, whereby the signal transmission mode through the medium of the electrical loop system is established.

At the same time, the relatively low rate clock pulse signal on the clock line 58 (e.g., clock of 250 KHz) is selected by the AND gate 96 and fed through an OR gate 104 to the line 64. Accordingly, the transmission rate is changed over to the low value of about 15 KHz.

In contrast, the line 48 remains decoupled from the lines 54 and 62 because the AND gates 114 and 90 are disabled or closed, while the line 66 is inhibited from being coupled to the line 54 because of the AND gate 88 being closed.

On the other hand, the signal disappears from the line 48 in each of the local control units 4-1 to 4-n, so that the signal level on the line 60 becomes logic "0" with the output of the AND gate 108 also being set to the level "0". Accordingly, the output of the inverter 86 is now logic "1", whereby the AND gates 92, 96 and 98 are enabled in place of the AND gates 88, 90 and 94, resulting in the state in which the lines 50 and 66 are coupled to the lines 62 and 52, respectively, to thereby establish the data transmission mode through the electric loop system. Since the line 58 is coupled to the line 64 through the AND gate 96, the clock signal of 250 KHz is selected to allow the signal transmission through the electrical loop system to be performed between the local control units 4-1, ..., 4-n and the central control unit 2.

Further, since the signal level on the line 112 is logic "1", the AND gates 114 and 116 are enabled (i.e. opened). Consequently, the line 50 is coupled to the line 52 through the AND gate 116 and the OR gate 106, whereby the signal sent out from the central control unit 2 can be simultaneously transmitted to the individual local control units 4-1, ..., 4-n.

From the above description, it will now be appreciated that when the signal transmission operation through the medium of the optical loop system employing optical fibers is shut down, the backing-up electric loop system employing the electric conductors is activated to perform the signal transmission in place of the optical loop system. Thus, a high reliability of the duplex loop systems can be retained.

The transmission controller 14 includes a MPU (microprocessor unit) 43 which in turn comprised lines 68a–68n, 60 and 110, I/O circuit connected to the input-/output lines of the electric devices/instruments 20–22, CPU, RAM and ROM.

The transmission controller 14 can be further adapted to monitor the running state of the engine of the motor vehicle to change over the operation mode through the medium of the optical loop system to the operation mode through the electrical loop system in dependence on the operating state of the motor vehicle in addition to the changing-over in response to the occurrence of abnormality in the optical loop system as described above.

Figure 7:
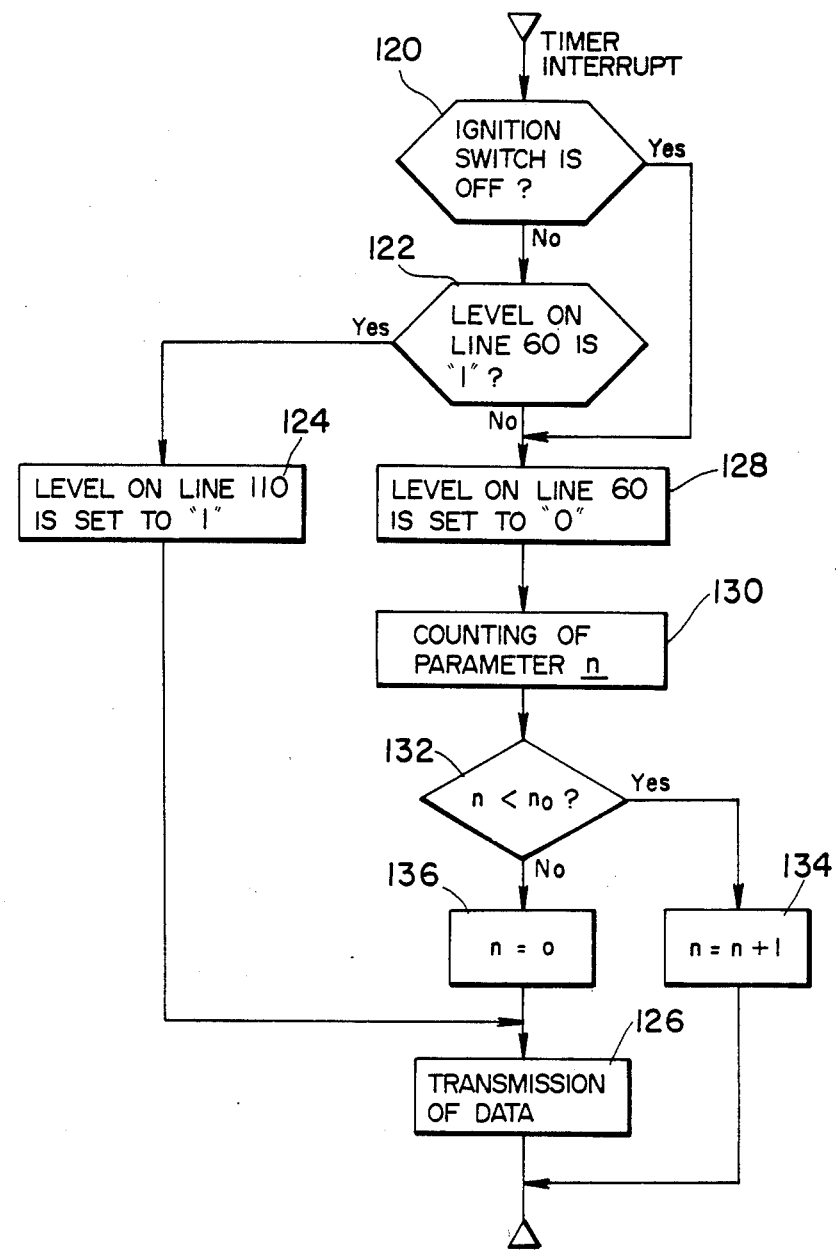
FIG. 7 is a flow chart for illustrating data control operation of the system according to the first embodiment of the invention.

FIG. 7 is a flow chart illustrating an example of the change-over control between the optical loop system and the electrical loop system executed by the transmission controller 14. As described hereinbefore, the transmission controller 14 is so arranged as to perform periodically the data transmission at a predetermined time interval. Correspondingly, the microcomputer or MPU 43 is adapted to start the processing shown in FIG. 7 at a predetermined time interval with a timer interrupt.

It is now assumed that the time taken for transmission of one frame is for example, 0.6 ms and that the timer interrupt takes place periodically at a time interval longer than 0.6 ms, e.g. every 1 ms.

Upon time interrupt, the state of the electric device 21 which may be an ignition switch 21 of the motor vehicle is checked at a step 120. If the switch is closed, it is decided that the engine of the motor vehicle is running. The interrupt routine then proceedes to a step 122 where the state of the signal on the line 60 is checked. When the signal state is logic "1", the signal level on the output line 110 (FIG. 2) of the MPU 43 is set to logic "1" at a step 124, whereby the optical loop transmission mode (i.e. transmission through the medium of the optical loop system employing the optical fibers) is established. It should however be noted that the setting of the signal level on the line 110 to logic "1" is made only in the central control unit. In the local control units, the signal level on the line 110 remains at the logic "0" level.

Subsequently, at a step 126, the transmission of data corresponding to one frame illustrated in FIG. 4 is performed.

In this manner, provided that the engine is running and that no abnormality occurs in the optical loop system, transmission of data corresponding to one frame is carried out upon every timer interrupt.

When the result of the decision step 120 is affirmative (YES), meaning that the engine is stopped or alternatively when the result of the decision step 122 is negative (NO), indicating that abnormality takes place in the optical loop system while the engine is running, a step 128 is executed where the signal level on the line 110 of the central control unit is set to "0", as the result of which the electrical loop transmission mode (i.e. transmission through the medium of the electrical transmission system) is established.

The routine thus proceeded to a step 130 where the counting of parameter n is initiated. More specifically, the count value n is read out from a soft counter in the RAM of the MPU 48. At a next step, it is checked whether the parameter n as read out is less than a preset constant $n_o$. So long as $n < n_o$, the parameter n is incremented by one at a succeeding step 134, whereupon the succeeding timer interrupt is awaited.

At a time point when execution of the steps 128 to 134 has been repeated $n_o$ times, the count value read out at the step 130 attains the value $n_o$, resulting in that the decision step 132 issues "NO". Consequently, a step 136 is executed to reset the count value of the soft counter to zero, being followed by the step 126 where data transmission of one frame is effected.

It should be noted that the value of the constant n is so selected as to be equal to or greater than the ratio of the clock frequencies on the lines 56 and 58 shown in FIGS. 2 and 3. For example, in case the clock frequency on the line 56 is 4 MHz with that of the line 58 being 250 KHz, then the constant $n_o$ may be so selected that $n_o \geq 16$.

It is thus apparent that when the engine is stopped or alternatively when the optical loop system suffers trouble or abnormality, the transmission mode is in the electrical loop transmission mode. At that time, the data transmission is conducted at a rate of $1/n_o$ of the frequency at which the data transmission is effected through the optical loop system.

Here, description will be made on the repetition period (the reciprocal of the data transmission frequency) of the data transmission.

From the standpoint of the intrinsic function of the data transmission, this period should be as short as possible. However, the permissible shortest period of such loop transmission system is determined in dependence on the length of the transmission signal frame illustrated in FIG. 4, the number of the local control units 4-1 to 4-n, the clock frequency and the time taken for the processing executed by the microcomputer (CPU) of the transmission controller 14 and cannot be made shorter than the determined value.

On the other hand, power consumption in this sort of system may be regarded as being proportional to the clock frequency.

Accordingly, in the case of the illustrated embodiment, the data transmission through the medium of the optical loop system is performed on the basis of high-rate clock supplied through the line 56 so long as the engine is running with the battery being charged, wherein the time interval at which the timer interrupt illustrated in FIG. 7 can take place is, i.e. the period at which the data transmission is effected, is selectively so set that the data transmission can be effected at a sufficiently high rate for practical application.

On the other hand, when the engine is stopped with the charging of the battery being interrupted, data transmission is changed over to the electrical loop system from the optical loop system to protect the electric power from being consumed by the photoelectric converters 32 and 38. At the same time, the data transmission through the electrical loop system is performed on the basis of the clock signal of low frequency on the line 58. Additionally, the repetition period for the data transmission is correspondingly decreased to $1/n_o$ of that for the optical loop transmission mode. In this conjunction, it should be understood that the decreased frequency of data transmission will give rise no problem in practice because the number of the devices/instruments to be controlled is correspondingly reduced when the engine is stopped.

In case the engine is running, noise is produced. Accordingly, the optical loop system which is inherently insensitive to noise should be employed for the data transmission. However, when the engine is stopped with generation of noise being significantly reduced, the data transmission through the electrical loop system can be employed.

As will be appreciated from the foregoing description of the preferred embodiment of the present invention, the loop transmission system using the optical fiber transmission path is duplexed by employing the electrical transmission path as one of the loops. As a result, there has been provided a multiplex communication system which is freed from the defects of the prior art and in which adequate back-up function is realized upon occurrence of abnormality in the optical loop transmission mode to assure a high reliability. The multiplex communication system can be operated, if necessary, with a sufficient and low power consumption and thus it can be effectively applied to the data transmission for motor vehicle or the like to suffice the intensive wiring.

In the case of the embodiment described above, it has been assumed that the data transmission rate in the electrical loop transmission mode is selected significantly lower than that in the optical loop transmission mode. It should however be appreciated that a same transmission rate can be employed in both transmission modes. In that case, the output frequency of the clock generator 44 is selected same in both the central and local control units shown in FIGS. 2 and 3. For example, only the high rate clock outputted to the line 56 is employed in common to the central and local control units. Further, the control steps 130 to 136 are excluded from the control process (illustrated in FIG. 7) executed by the MPU 43 of the central control unit.

Next, a second embodiment of the present invention will be described.

According to the second embodiment, there is provided a duplex loop communication system including an optical fiber transmission path and an electrical transmission path and imparted with the same functions as those of the first embodiment described above, wherein the status of data transmission through the optical loop system is monitored by data transmission through the electrical loop system to thereby diagnose the optical loop system as to the malfunction or failure.

Figure 8:
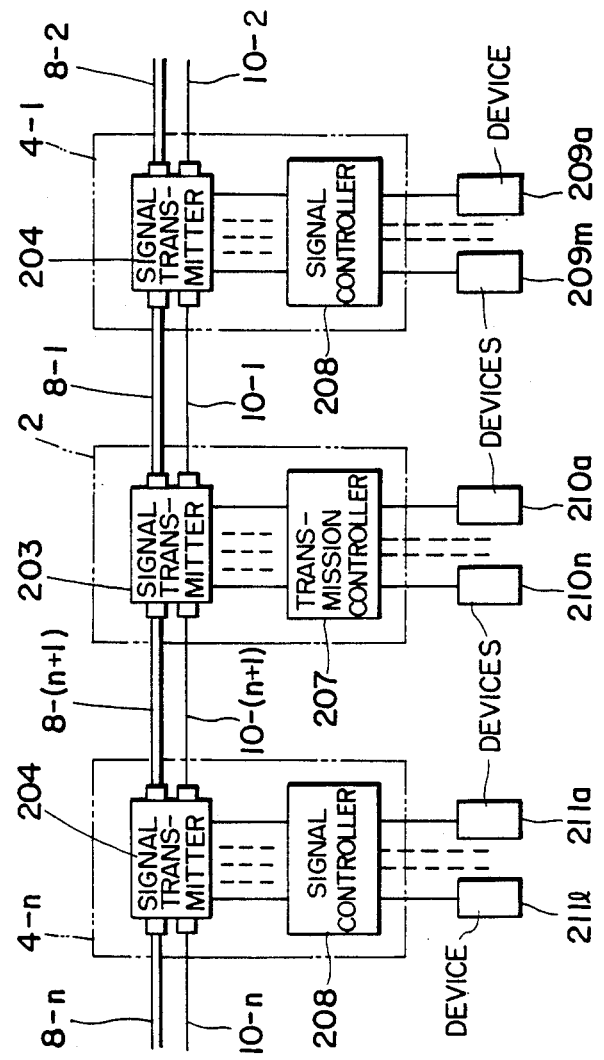
FIG. 8 is a block diagram showing a general arrangement of a multiplex communication system according to a second embodiment of the present invention.

FIG. 8 is a block diagram showing a basic structure of the duplex communication system according to the second embodiment. As in the case of the first embodiment, the central control unit 2 and a plurality of local control units 4-1, . . . , 4-n are interconnected by way of an optical path composed of optical fibers 8-1, 8-2, . . . , 8-n, 8-(n+1) and an electrical path composed of electrical signal conductors 10-1, 10-2, . . . , 10-n and 10-(n+1) in the form of a duplex loop configuration.

The central control unit 2 includes a signal transmitter 203 and a signal transmission controller 207 for controlling the signal transmission or transfer with the local control units 4-1, . . . , 4-n. Further, the central control unit 2 serves to control electric devices/instruments 210a, . . . , 210n.

Each of the local control units 4-1, . . . , 4-n includes a signal transmitter 204 and a signal controller 208 and serves for controlling the associated electric devices/instruments 209a, . . . , 209m as well as detection of the operating states of the latter. The signal transmitted through the optical loop system and the electrical loop system is of the same format as the one illustrated in FIG. 4.

Figure 9:
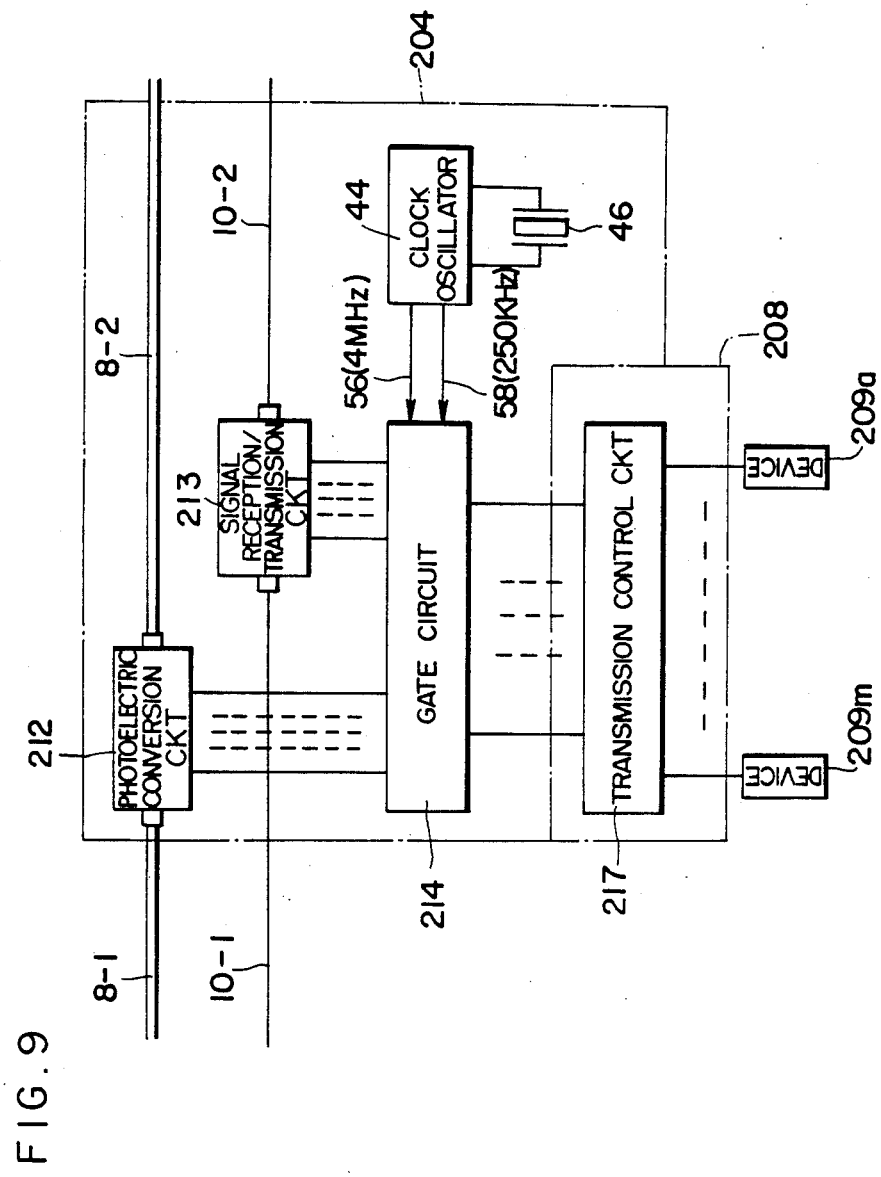
FIG. 9 is a block diagram showing a circuit configuration of a local control unit employed in the communication system shown in FIG. 8.

FIG. 9 shows in a block diagram a circuit arrangement of the local control unit 401. It should however be understood that the other local control units can be implemented in the same circuit configuration and that the following description applies true. In FIG. 9, a reference numeral 212 denotes a photoelectric converter circuit for converting a light input signal fed from the optical fiber section 8-1 to a corresponding electrical signal, which is then supplied to a gate circuit 214. Further, the photoelectric converter circuit 212 serves to convert the electrical signal supplied from the gate circuit 214 to a light signal which is then supplied to the optical fiber section 8-2. A numeral 213 denotes a signal transmission/reception circuit for supplying the input signal from the electrical signal conductor 10-1 to the gate circuit 214 while supplying the output signal from the gate circuit onto the electrical signal conductor 10-2. A numeral 44 denotes an oscillation circuit of the same structure as that shown in FIG. 3. The oscillation circuit 44 is coupled to the gate circuit 214 by way of lines 56 and 58 on which clock signals of mutually different frequencies make appearance, respectively.

A transmission control circuit 217 is of the substantially same structure as that shown in FIG. 5 and serves to convert a serial signal inputted thereto through the gate circuit 214 to a parallel signal which is then applied to the electrical devices/instruments 209a, . . . , 209m for the control thereof. Further, the transmission control circuit 217 serves for detecting the states of the electrical devices/instruments 209a, . . . , 209m and supplying the output signals of the latter to the gate circuit 214 in the form of a serial signal.

Figure 10:
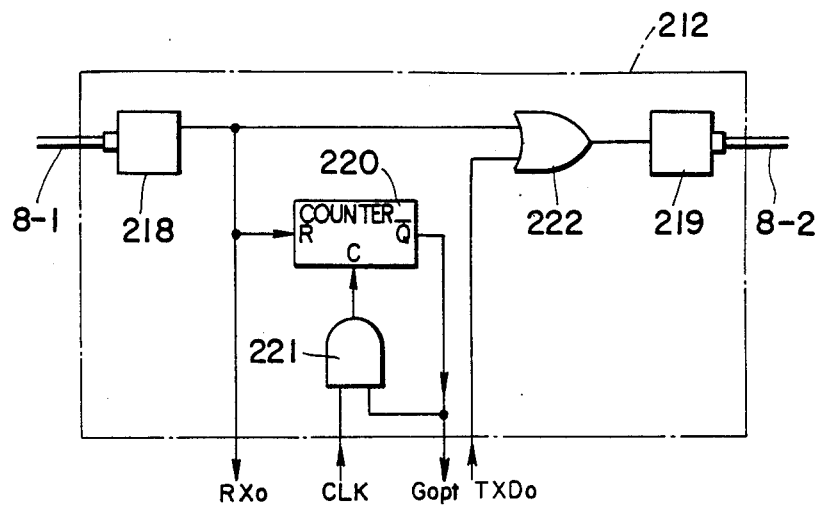
FIG. 10 is a circuit diagram showing a configuration of a photoelectric converter circuit.

FIG. 10 shows an exemplary circuit configuration of the photoelectric conversion circuit 212 shown in FIG. 9. It is assumed that the signals having the frame structure shown in FIG. 4 and received by the local control unit 4 through the optical loop system and the electrical loop system are represented by $RX_o$ and $RX_e$, respectively, while the signals sent out from the local control unit through the optical loop system and the electrical loop system are represented by $TXD_o$ and $TXD_e$, respectively. The light input signal impinging from the optical fiber section 8-1 is converted into an electrical signal through an optoelectronic converter 218, which is then supplied to the gate circuit 214 as the reception signal $RX_o$ of the frame structure shown in FIG. 4 on one hand, and to an electrooptical converter 219 through an OR gate 222 to be converted into light signal which is then fed to the optical fiber 8-2. Further, the reception signal $RX_o$ is also applied to a reset terminal R of the counter 220. The counter 220 serves to detect the presence or absence of the reception signal $RX_o$ and hence the presence or absence of failure in the optical loop. When the reception signal is present, the output signal $G_{opt}$ of the counter 220 making appearance at the terminal Q thereof is logic "1". More specifically, the signal $G_{opt}$ and the clock signal fed from the gate circuit 214 are inputted to an AND gate 221 whose output is connected to a terminal C of the counter 220.

Operation of the counter 220 will be described by referring to a time chart shown in FIG. 11. When the optical loop system operates normally, the reception signal $RX_o$ of the frame structure illustrated in FIG. 4 is periodically applied to a reset terminal R of the counter 220. So long as the reception signal $RX_o$ is applied to the reset terminal, the counter 220 does not count the clock pulses, resulting in that the output signal $G_{opt}$ produced at the output terminal $\overline{Q}$ is logic "1" because the content of the counter does not exceed a predetermined value N. On the other hand, unless the reception signal $RX_o$ is applied to the reset terminal R, the counter 220 counts the clock pulses CLK supplied from the AND gate 221.

However, the count value can not attain the predetermined value N because the count content in the counter 220 is reset by the reception signal $RX_o$. Accordingly, the output signal $G_{opt}$ from the counter 220 remains logic "1". Assuming now that the reception signal $RX_o$ is blocked at a time point $t_1$ due to some trouble in the optical loop system, the counter 220 begins to count the clock pulses CLK. When the content of the counter 220 reaches the predetermined value N at a time point $t_2$, the output signal $G_{opt}$ appearing at the output terminal $\bar{Q}$ of the counter 220 assumes logic "0" level. Consequently, the AND gate 221 is blocked, inhibiting the clock signal CLK from being supplied to the counter 220. The output signal $G_{opt}$ thus remains logic "0". In this way, failure or abnormality in the optical loop system can be detected in dependence on the levels of the output signal $G_{opt}$ of the counter 220. The output signal $G_{opt}$ is supplied to the gate circuit 214 (FIG. 9). The transmission data $TXD_o$ of the optical loop system supplied through the gate circuit 214 is applied to the other input terminal of the OR gate 222 to be placed in the transmission frame.

Figure 12:
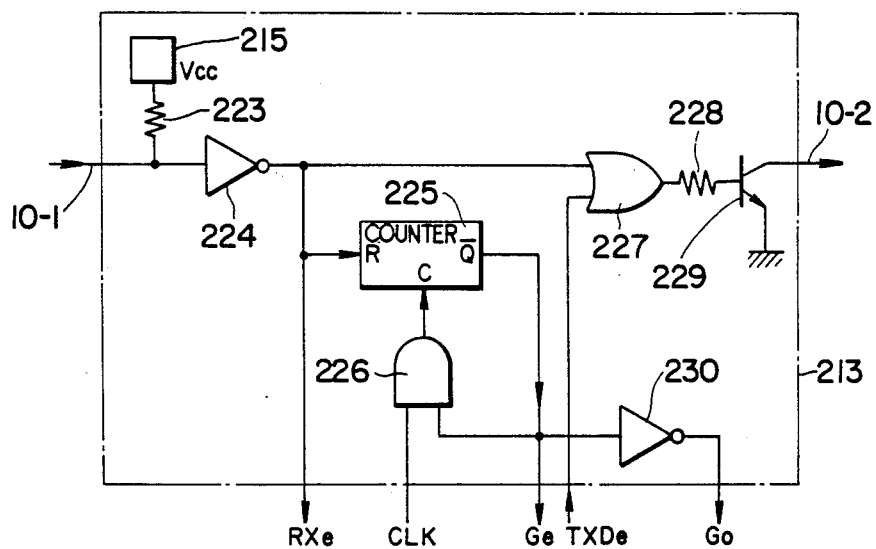
FIG. 12 is a circuit diagram showing a circuit configuration of a signal transmission/reception circuit.

The transmission/reception circuit 213 shown in FIG. 9 can be implemented in a circuit configuration shown in FIG. 12. The electrical input signal conveyed through the electrical conductor 10-1 is supplied to an inverter 224. The electrical conductor or line 10-1 is pulled up to the output voltage $V_{cc}$ of a DC voltage source 215 through a resistor 223. The other end of the signal conductor or line 10-1 is connected to an output transistor of the transmission/reception circuit of the preceeding local control unit in a same manner in which the output conductor 10-2 of the transmission/reception circuit 213 under consideration is connected to the output transistor 229 thereof, as is shown in FIG. 12. There appears at the output terminal of the inverter 224 the reception signal $RX_e$ of the electrical loop system having the frame structure illustrated in FIG. 4. The signal $RX_e$ is supplied to an OR gate 227, a counter 225 and a gate circuit 214 (FIG. 9).

The counter 225 is of a substantially similar structure to that of the counter 220 shown in FIG. 10 and operates in a same manner as the latter. More specifically, when the signal $RX_e$ is present, the output signal $G_e$ produced at the $\bar{Q}$ terminal of the counter 225 assumes the logic "1" level, wherein the AND gate 226 is enabled or opened to allow the clock pulses CLK to be applied to the terminal C of the counter 225.

On the other hand, when the reception signal does not make appearance over a predetermined time span, the output signal $G_e$ of the counter 225 is switched to the logic "0" level, to thereby block the AND gate 226. In this way, the output signal $G_e$ of level "1" indicates that the data transmission is effected through the medium of the electrical loop system. The output signal $G_e$ is applied directly to the gate circuit 214 shown in detail in FIG. 13 on one hand, and indirectly through an inverter 230 to the gate circuit 214 on the other hand. As a consequence, when the output signal $G_e$ is logic "1", the signal gate 235 is opened by the signal $G_e$ to thereby allow the data transmission to be effected through the electrical loop system, while a signal gate 234 for the data transmission through the optical loop system is blocked by the signal $G_o$ outputted from the inverter 230. In contrast, when the output signal $G_e$ is logic "0" with the signal $G_o$ being logic "1", the signal gate 234 is opened or blocked while the signal gate 235 is closed, resulting in that the data transmission is carried out through the optical loop system in place of the electrical loop system.

The data $TXD_e$ to be transmitted through the electrical loop system is applied to the other input terminal of the OR gate 227 whose output signal is applied to the transistor 229 by way of a resistor 228 to be sent out on the signal line 10-2. Provision of the inverter 224 is for the purpose of restoring the inverted electrical signal outputted from the transistor 229 to the original non-inverted form.

Figure 13:
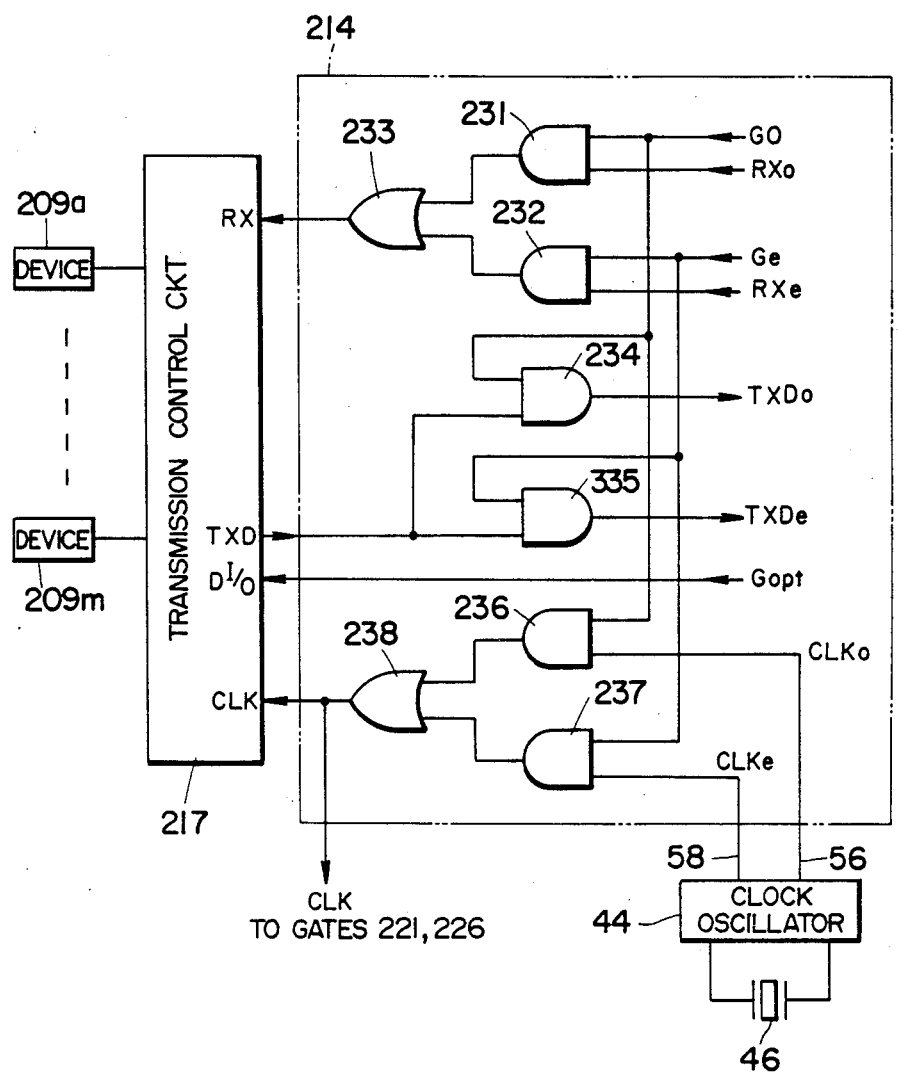
FIG. 13 is a circuit diagram showing a gate circuit employed in the local control unit.

FIG. 13 shows a typical circuit configuration of the gate circuit 214 shown in FIG. 9. Exchanged between the gate circuit 214 and the circuits shown in FIGS. 10 and 12 are the control signal $G_o$ for selecting the data transmission through the optical loop, the control signal $G_e$ for selecting the data transmission through the electrical loop system, the reception signal $RX_e$ from the electrical loop system, the reception signal $RX_o$ from the optical loop system, the transmission data $TXD_o$ to the optical loop system, the transmission data $TXD_e$ to the electrical loop system, the signal $G_{opt}$ for indicating the presence or absence of the reception signal signal $RX_o$ from the optical loop system, and the clock signal CLK. The oscillation circuit 44 produces the high-rate clock signal $CLK_o$ (e.g. of 4 MHz) for the transmission through the optical system and the low-rate clock signal $CLK_e$ (e.g. of 250 KHz) for the transmission through the electrical loop system. The control signal $G_o$ and the reception signal $RX_o$ are inputted to an AND gate 231. The control signal $G_e$ and the reception signal $RX_e$ are inputted to an AND gate 232. The outputs of the AND gates 231 and 232 are logically ORed by an OR gate 233 whose output is applied to a reception terminal RX of the transmission control circuit 217. On the other hand, the data $TXD_o$ for transmission from the send-out terminal TXD of the transmission control circuit 217 is inputted to an AND gate 234 together with the control signal $G_o$, whereby the data $TXD_o$ for transmission is placed in the transmission frame to be outputted to the optical loop system. On the other hand, the signal produced at the terminal TXD and the control signal $G_e$ are logically ANDed by the AND gate 235 whose output is supplied to the electrical loop system as the data $TXD_e$ for transmission. The signal $G_{opt}$ is applied to the DI/O terminal of the transmission control circuit 17, wherein the signal $G_{opt}$ indicating the presence or absence of the failure in the optical loop system is outputted from the terminal TXD as the transmission data $TXD_e$ to be sent to the central control unit 2 through the optical loop system. The clock signal $CLK_o$ and the control signal $G_o$ are logically ANDed by the AND gate 236, while the clock signal $CLK_e$ and the control signal are logically ANDed by the AND gate 237, wherein the outputs of the AND gates 236 and 237 are logically ORed by the OR gate 238 which in turn outputs the clock signal CLK applied to the input terminal CLK of the transmission control circuit.

Figure 14:
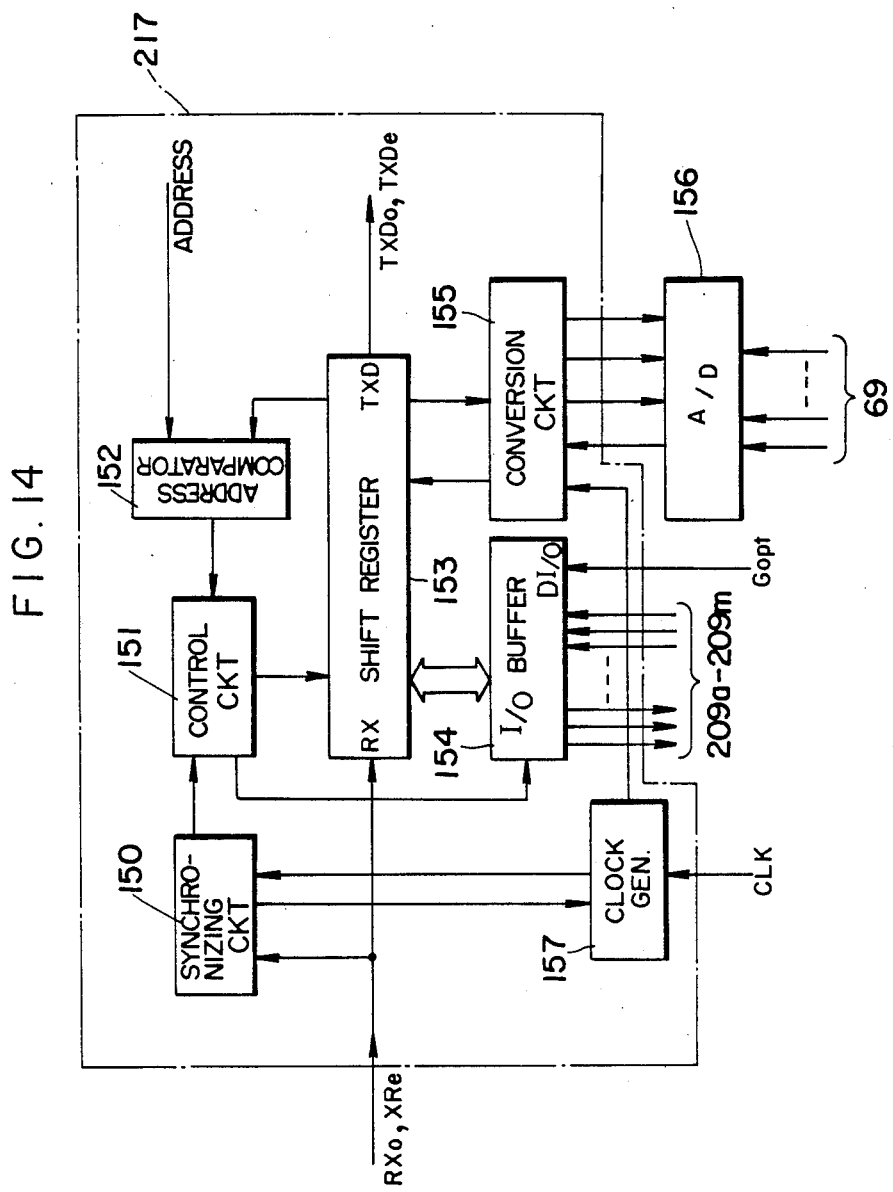
FIG. 14 is a block diagram showing an exemplary embodiment of the transmission control circuit.

FIG. 14 is a block diagram showing a typical circuit configuration of the transmission control circuit constituting a part of the local control unit. The circuit configuration of this transmission control circuit is of substantially same structure as that of the first embodiment shown in FIG. 5. Accordingly, repeated description will be unnecessary. It will be sufficient to note that the output clock signal CLK of the OR gate 238 of the gate circuit 214 shown in FIG. 13 is applied to the input of the clock generator 157, while the control signal $G_{opt}$ is applied to the input terminal DI/O of the I/O buffer 154, and the reception signals $RX_o$ and $RX_e$ are inputted to the shift resister 153.

Figure 15:
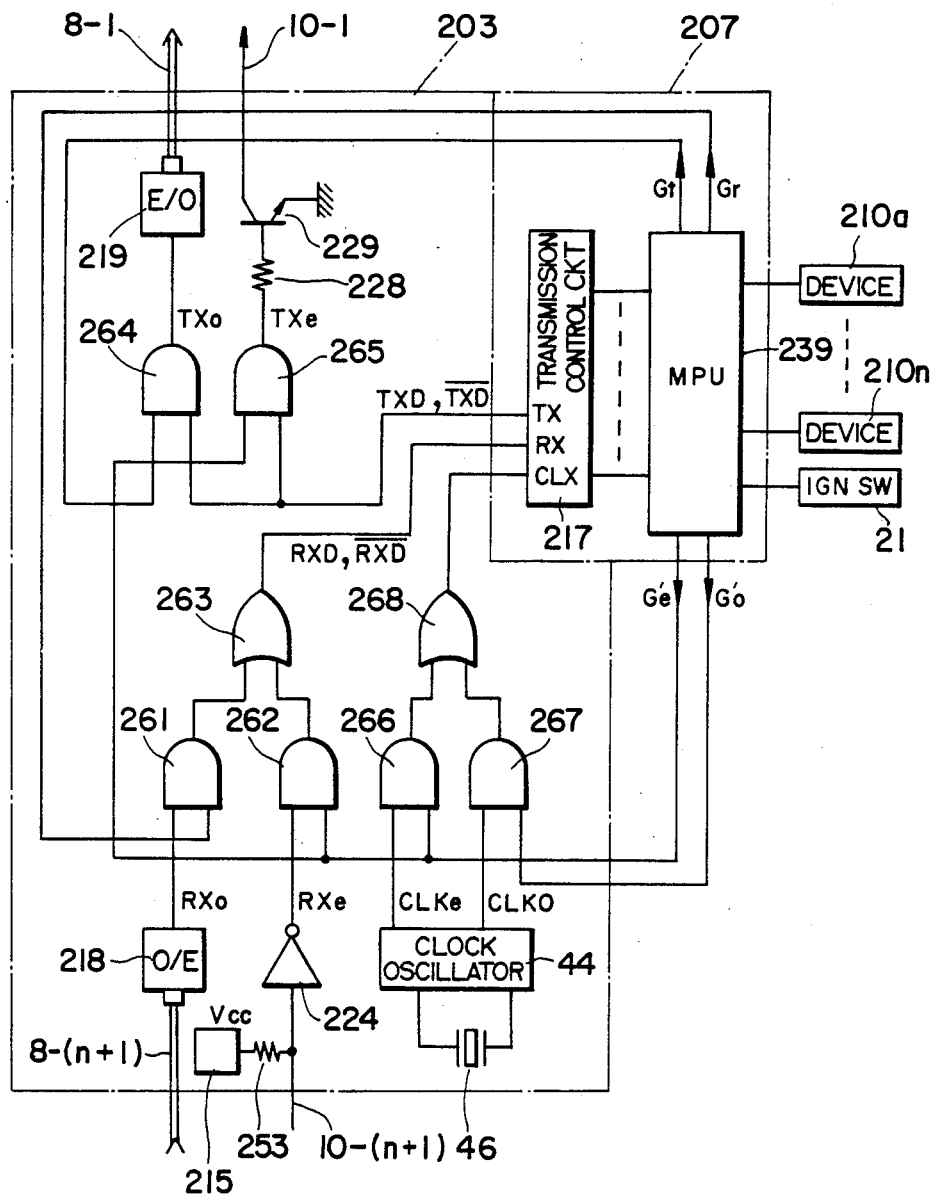
FIG. 15 is a circuit diagram showing a circuit configuration of the central control unit.

FIG. 15 shows typical circuit configurations of the signal transmitter 203 and the signal transmission controller 207 of the central control unit 2.

The light signals inputted through the optical fiber section 8-(n+1) from the local control unit 4n and representing the transmission frame signals TXD and $\overline{\text{TXD}}$ are converted into electric signals through the optoelectric converter 218 to be subsequently supplied to an AND gate 261 as the reception signal $RX_o$. On the other hand, the electrical input signal of the transmission frame supplied from the local control unit 4n through the electrical signal conductor 10-(n+1) is inverted by the inverter 224 and supplied to the AND gate 262 as the reception signal $RX_e$.

The transmission control circuit 217 is of a same structure and performs the same operation as that shown in FIG. 13 except that the DI/O input terminal is not provided. The signal of the frame TXD and $\overline{\text{TXD}}$ illustrated in FIG. 4 is produced from the output terminal TX of the transmission control circuit 217 and ANDed with the output signal $G_t$ from the MPU 239 by the AND gate 264 whose output signal is fed to the optical fiber 8-1 as the transmission signal $TX_o$ through the electrooptical converter 219. On the other hand, the output signal from the terminal TXD and the output signal $G_e$ of the MPU 239 are logically ANDed by the AND gate 265 whose output is then sent out onto the electrical signal conductor 10-1 as the transmission signal $TX_e$ through the resistor 228 and the transistor 229. These transmission signals $TX_o$ and $TX_e$ are received by the local control unit as the reception frame signals RXD and $\overline{\text{RXD}}$ illustrated in FIG. 4. The MPU 239 is of a substantially same function as the MPU 43 and includes a microcomputer.

The MPU 239 controls the transmission control circuit 217 to perform exchange of signal with the local control units 4-1, ..., 4-n, data processing and others. Since the presence or absence of the reception signal $RX_o$ or $RX_e$ is determined by the MPU 239 by fetching the data applied to the input terminal RX of the transmission control circuit 217, the MPU need not incorporate the counter such as those 220 and 225 of the circuits shown in FIGS. 10 and 12. The reception signal $RX_o$ is inputted to an AND gate 261 together with the signal $G_r$, while the reception signal $RX_e$ is inputted to an AND gate 262 together with the signal $G_e'$. The output signals of both AND gates 261 and 262 are logically ORed by an OR gate 263 whose the output is coupled to the reception signal terminal RXD of the transmission control circuit 217 through the OR gate 263. The high-rate clock $CLK_o$ produced by the clock generator 44 for the transmission through the optical loop system is inputted to an AND gate 267 together with the signal $G_o'$, while the low-rate clock $CLK_e$ for the optical loop system is inputted to an AND gate 266 together with the signal $G_e$, wherein the outputs of both AND gates 266 and 267 is applied to the input terminal CLK of the transmission control circuit 217 by way of an OR gate 268.

It is determined by a control program stored in the MPU 239 which of the optical loop system and the electrical loop system is to be selected for data transmission. The result of the determination is indicated by the signal levels of the individual signals $G_o'$, $G_e'$, $G_r$ and $G_t$. More specifically, the signal $G_o'$ serves to determine whether the data transmission is to be carried out through the optical loop system. When the level of this signal $G_o'$ is logic "1", the data transmission is made through the optical loop system. The signal $G_e'$ serves to determine whether the data transmission is to be conducted through the electrical loop system. When the level of this control signal $G_e'$ is logic "1", this means that the data transmission is to be conducted through the electrical loop system. The control signal $G_r$ plays a role in determining whether the reception signal $RX_o$ from the optical loop system is to be received or not. The logic level "1" of this signal $G_r$ means that the signal $RX_o$ is to be received. Finally, the control signal $G_t$ serves to determine whether the transmission signal $RX_o$ is to be transmitted through the optical loop or not. The logic level "1" of this signal $G_t$ means that the signal $TX_o$ is to be transmitted through the electrical loop system.

The transmission control circuit 217 is of a substantially same configuration as the one shown in FIG. 14 except that the input/output terminals of the I/O buffer are connected to the MPU 239 in the case of the former.

In the case of the instant embodiment, when engine is stopped, i.e. when the output signal of the ignition key switch 21 connected to the MPU 239 is "0", data transmission is conducted through the medium of the electrical loop system. This is because the data transmission through the optical system brings about relatively large power consumption due to operation of the light emitting elements incorporated in the photoelectrical converter. In other words, when the data transmission is conducted through the optical loop system during the engine stoppage, there arises possibility that the battery should be exhausted within a relatively short time. To prevent this, the data transmission is effected through the electrical loop system. In this conjunction, it should be mentioned that the current consumption of each light emitting element may amount to 20 to 50 mA. Accordingly, when the number of the local control units as provided is about ten, the power of more than a half the capacity of the battery which may be 40 Ampere/hour will be consumed by the light emission elements within a few days. For this reason, it is preferred that the data transmission through the electrical loop system which is low in power consumption (ca. 1/100 of the power consumption brought about by the data transmission through the optical system) should be adopted in the state of the engine being stopped.

Accordingly, during the stoppage of engine, levels of the signals $G_e'$, $G_o'$, $G_r$ and $G_t$ are set to "1", "0", "0" and "0", respectively. As the consequence, the electrical loop system is selected for the data transmission, wherein the low-rate clock CLK of the clock generator 44 is selected to be fed to the transmission control circuit 217. Thus, the reception signal $RX_e$ is applied from the electrical loop system to the reception terminal RXD with the transmission signal $TX_e$ for the transmission through the electrical loop system is outputted as the transmission signal TXD. Further in each of the local control units, the signal $G_e$ is logic "1" with the signals $G_{opt}$ and $G_o$ being "0", respectively, whereby the data transmission through the electrical loop system takes place.

On the other hand, when the engine is running, i.e. when the output of the ignition switch 21 is logic "1", the signals $G_o'$, $G_r$, $G_t$ and $G_e'$ of the MPU 239 are set to "1", "1", "1" and "0", respectively. As the consequence, the high-rate clock $CLK_o$ is effective as the clock signal CLK in the central control unit, allowing the reception signal $RX_o$ from the optical loop system to be received, while the signal $TX_o$ for transmission through the optical system is outputted from the central control unit. Similarly, in each of the local control units, the signals $G_o$ and $G_{opt}$ become logic "1", respectively, while the level of the signal $G_e$ is "0", to allow the data transmission through the optical loop system. In this state, since the battery is constantly charged, there is no fear that the battery is exchausted. Accordingly, the optical loop system inherently insusceptible to electric noise and assuring high rate transmission is utilized for the data transmission.

By the way, electric conductors or wires have long been used in motor vehicles and found to be capable of withstanding various environmental conditions prevailing within the motor vehicle. In contrast, the optical fibers and optoelectronic or electrooptical elements have been too rarely used in the motor vehicle to determine whether they can be employed for the purpose of data transmission in the adverse environment. In general, the optical fibers are more susceptive to adverse influence of temperature, vibration and others than the electrical conductor or wire. Accordingly, it is of great significance for the safety of the operation of motor vehicle that the optical loop system is positively diagnosed for activating the back-up system and evaluating the location of failure if occurs in the optical loop system.

With the instant embodiment, it is intended to back up the optical loop system upon occurrence of failure, evaluate the location of failure and trigger an alarm.

To this end, the optical loop system is diagnosed as to the presence of failure at a time before starting the engine. If the failure is present, location thereof is determined. Additionally, the optical system is backed up by the electrical loop system. For carrying out the diagnosis, the signals $G_o$ and $G_r$ are set to "0", respectively, in the central control unit while the signals $G_e'$ and $G_t$ are set to "1", respectively, for transmitting a signal through both the optical loop system and the electrical loop system under the timing of the low-rate clock from the central control unit, wherein the latter receives only the transmission signal TXD from the electrical loop system, the signal TXD containing the information about failure.

Figure 16:
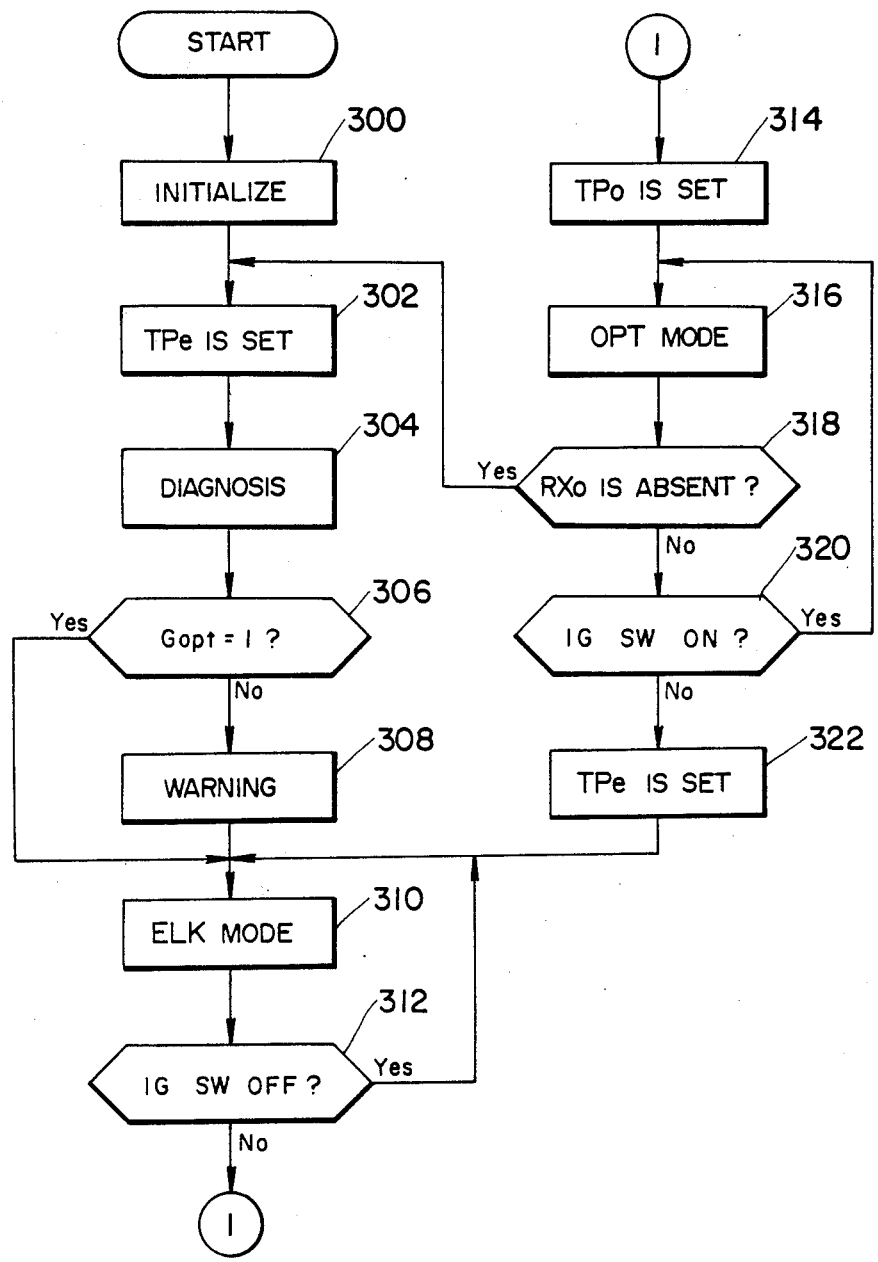
FIG. 16 is a flow chart for illustrating data processings executed in the multiplex communication system according to the second embodiment of the invention.

Next, description will be made on the control procedure taken in the instant embodiment of the invention by referring to FIG. 16. When the system is powered on or alternatively a reset button (not shown) is pushed in the state in which the system is supplied with power, a program stored in ROM incorporated in the MPU is executed, whereupon the aimed control is started.

First, initialization is effected at a step 300.

Subsequently, at a step 302, the time interval $TP_e$ at which the data is to be transmitted through the electrical loop system is set at a soft timer in the RAM of the MPU 239. More specifically, assuming that the time taken for transmission of the one frame of transmission signal shown in FIG. 4 is 0.6 ms, for example, the time interval $TP_o$ for the data transmission through the optical loop system is 1.0 ms, while the time interval $TP_e$ for the data transmission through the electrical loop system is 16.0 ms which is 16 times as long as the time interval $TP_o$.

Accordingly, at the step 302, the time interval $TP_e$ is set at the soft timer in the MPU, whereby the succeeding steps 304 to 312 are excuted at every time interval $TP_e$.

At the step 304, preparation for the diagnosis of failure in the optical loop system is made. More specifically, the central control unit sends out the transmission frame signals TXD and $\overline{TXD}$ to the individual local control unit through the optical loop system and the electrical loop system at the low transmission rate set for the electrical loop system. The transmission data from the individual local units are received by the central control unit only through the electrical loop system. To this end, the output signals $G_o'$, $G_e'$, $G_r$ and $G_t$ of the MPU 239 are set to "0", "1", "0" and "1", respectively.

When the optical loop system is normal, the level of the signal $G_{opt}$ is logic "1". However, when failure is present in the optical loop system, the signals $G_{opt}$ of the individual local control units disposed upstream of the location of the optical loop where failure takes place are at the level "1", while the signals $G_{opt}$ of the local control units disposed downstream of the location when the failure occurs assume the level "0".

These signals $G_{opt}$ are fed to the central control unit through the electrical loop system as the transmission data $TXD_e$ and supplied to the MPU 239 as the reception signal $RX_e$. The MPU 239 then determines on the basis of the reception signal $RX_e$ whether the optical loop suffers failure and evaluates the location of failure, if present, which failure is informed to operator through a suitable display means (not shown) at a step 308.

When the signals $G_{opt}$ from all the local control units are at level "1", it is determined that no failure is present in the optical loop. The control procedure then proceedes to a step 310.

At the step 310, the data transmission mode through the electrical loop system, i.e. the ELK mode, is established. To this end, the output signals $G_e'$, $G_o'$, $G_r$ and $G_t$ of the MPU 239 are set to "1", "0", "0" and "0", respectively, whereby the data transmission is effected through the electrical loop system at the transmission rate destined for the ELK mode.

Next, at a step 312, the state of the ignition key switch 21 is monitored at by a given one of the control units (the central control unit in the case of the illustrated embodiment). When the output signal of the ignition switch representative of the state of engine is logic "0", the step 310 is regained to continue the ELK mode because the engine is stopped. On the other hand, when the ignition switch is turned on and producing the output signal of level "1", indicating that the engine is running, the control procedure proceeds to a step 314. In this manner, so long as the ignition switch 21 is opened, the ELK mode is continuously executed at the predetermined time interval $TP_e$ at the step 310. In other words, the one-frame signal is transmitted through the electrical loop system at every time interval $TP_e$.

At the step 314, the MPU 239 sets the time interval $TP_o$ at which the data is to be transmitted through the optical loop system. Accordingly, from this time point, the timer interrupt to the MPU is activated at the time interval $TP_o$, whereby succeeding steps 316 to 320 are executed at every time interval $TP_o$.

Next, the control procedure procedes to a step 316 where the data transmission through the optical loop system, i.e. the OPT mode, is triggered. To this end, the signals $G_e'$, $G_o'$, $G_r$ and $G_t$ are set to "0", "1", "1" and "1", respectively, in the central control unit, whereby the data transmission can be effected only through the optical loop system at the high clock rate destined for the OPT mode.

At a next step 318, it is checked in the central control unit whether the reception signal RX$_o$ is received from the optical loop system. If otherwise, it is decided that the optical loop system suffers failure, whereupon the step 302 is regained to execute the steps 302 to 312.

In case the signal RX$_o$ is received, the procedure proceeds to a step 320 to check whether the ignition switch is turned on. If so, the steps 316 to 318 are executed to continue the OPT mode. If the ignition switch is off, the time interval TP$_e$ for the data transmission through the electrical loop system is set at a step 322, whereupon the step 310 is regained to execute the ELK mode.

In conjunction with the step 302, the state of an accessary switch may be checked. In that case, when the ignition switch is OFF and when the accessary switch is turned on from the OFF-state, the step 304 can be executed.

In this manner, the diagnosis of failure in the optical loop system is performed with the aid of the electrical loop system without fail at the start time when the key switch is turned on, i.e. when the present system is powered on, whereby high reliability can be assured.

It should be added that when the diagnosis at the step 304 results in that the optical loop system suffers failure, the data transmission may be continued through the electrical loop system in the ELK mode even when the key switch is found ON at the step 312. Thus, the backup of the system can be assured even when failure occurs in the optical loop system, to thereby assure a further improved reliability.

As will be appreciated from the foregoing description, the optical loop system suffering failure can be backed up by the electrical loop system, while the diagnosis of the optical loop as to the presence of failure is conducted without fail upon the start of operation of the communication system, whereby the reliability of the duplex loop communication system can be further enhanced. Additionally, the disclosed duplex loop communication system can enjoy the advantages mentioned below.

(1) The system can be inexpensively implemented in a simplified structure while assuring high reliability and improved performance.
(2) Electric power can be saved when the engine is stopped.
(3) Diagnosis of failure in the optical system is automatically conducted without fail upon starting of operation, to improve the reliability.
(4) Upon detection of failure, location where the failure takes place can be displayed, to facilitate the repair.

In the foregoing description, it has been assumed that the data transmission rate TP$_e$ for the transmission through the electrical loop system is selected low as compared with the data transmission rate TP$_o$ in the OPT mode. It should however be understood that both the transmission rates TP$_e$ and TP$_o$ can be selected equal to each other. In this case, only one clock, e.g. high-rate clock CLK$_o$ of the oscillator 44 is selected in the signal transmitters 207, 208 of both central and local control units. Further, the transmission rates TP$_e$ and TP$_o$ at the steps 314, 322 and 302 of the control procedure shown in FIG. 16 are made equal to each other, or the steps 314 and 322 are excluded from the execution by the MPU 239 of the central control unit and the procedure proceeds to the step 304 when it is determined that the RX$_o$ is absent at the step 318.

We claim:

1. A multiplex communication system, comprising:
   a central control unit including signal transmitter means and transmission control means;
   a plurality of local control units;
   an optical loop transmission path interconnecting said signal transmitter means of said central control unit and said plurality of local control units by optical fibers in a loop-like configuration to thereby cause data transmission to be effected among said control units through said optical fibers; and
   an electrical loop transmission path for interconnecting said signal transmitter means of said central control unit and said plurality of local control units by electrical signal conductors in a loop-like configuration to thereby cause data transmission to be effected among said control units through said electrical signal conductors;
   wherein said transmission control means of said central control unit selects at least one of said optical loop transmission path and said electrical loop transmission path to be connected to said signal transmitter means in dependence on predetermined conditions, so that data transmission is conducted between said central control unit and said local control units through said selected loop transmission path.

2. A multiplex communication system according to claim 1, said central control unit and said local control units are installed in a motor vehicle, wherein said transmission control means selects the loop transmission path in dependence on the controlled states of said motor vehicle.

3. A multiplex communication system according to claim 2, further including status detecting means for detecting the state of engine of said motor vehicle, wherein said transmission control means selects said optical loop transmission path for data transmission when it is detected by said detecting means that the engine is running.

4. A multiplex communication system according to claim 3, wherein said transmission control means selects said electrical loop transmission path for data transmission when it is detected by said detecting means that the engine is stopped.

5. A multiplex communication system according to claim 4, wherein said signal transmitter means of said central control unit includes first failure detecting means for detecting failure of said optical loop transmission path, and said transmission control means selects said electrical loop transmission path in place of said optical loop transmission path when failure of said optical loop transmission path is detected by said first failure detecting means in the course of data transmission through said optical loop transmission path.

6. A multiplex communication system according to claim 5, each of said local control units including second failure detecting means for detecting failure of said optical loop transmission path, wherein data transmission is conducted through said electrical loop transmission path in place of said optical loop transmission path when said second failure detecting means detects failure of said optical loop transmission path in the course of data transmission therethrough.

7. A multiplex communication system according to claim 3, wherein said status detecting means includes an ignition switch of a motor vehicle.

8. A multiplex communication system according to claim 4, further including third failure detecting means for detecting failure of said optical loop transmission path on the basis of data transmitted therethrough, wherein said transmission control means of said central control unit conducts data transmission to each of said local control units through both of said optical loop transmission path and said electrical loop transmission path for the purpose of diagnosing said optical loop transmission path as to failure thereof, each of said local control units sending the output of said third failure detecting means to said central control unit through said electrical loop transmission path, said central control unit diagnoses said optical loop transmission path as to failure thereof on the basis of the output of said third failure detecting means of each of said local control units.

9. A multiplex communication system according to claim 8, wherein said central control unit produces display of location where failure takes place in said optical loop transmission path on the basis of the output signals of said third failure detecting means of each local control unit.

10. A multiplex communication system according to claim 9, wherein said transmission control means of said central control unit performs said diagnosis as to the presence of failure in said optical loop transmission path in response to interruption of data reception in the course of data transmission through said optical loop transmission path.

11. A multiplex communication system according to claim 10, wherein said transmission control means selects said electrical loop transmission path in place of said optical loop transmission path for data transmission upon detection of failure in said diagnosis.

12. A multiplex communication system according to claim 8, wherein said diagnosis is performed upon electrical connection of said system to a power supply source before said engine is started.

13. A multiplex communication system according to claim 1, wherein rate of data transmission through said optical loop transmission path is higher than rate of data transmission through said electrical loop transmission path.

* * * * *